US005494477A

United States Patent [19]
Flood et al.

[11] Patent Number: 5,494,477
[45] Date of Patent: Feb. 27, 1996

[54] ABRASIVE TOOL INSERT

[75] Inventors: Gary M. Flood, Canal Winchester; David M. Johnson, Westerville; Henry S. Marek, Worthington, all of Ohio

[73] Assignee: General Electric Company, Worthington, Ohio

[21] Appl. No.: 105,523

[22] Filed: Aug. 11, 1993

[51] Int. Cl.⁶ ...................................................... E21B 10/46
[52] U.S. Cl. .......................... 451/540; 175/428; 175/432; 175/434; 407/118
[58] Field of Search .................................. 51/204, 209 R; 175/426, 428, 432, 434; 299/79; 76/108.2, DIG. 12; 407/32, 11 B, 119; 451/540, 548

[56] References Cited

U.S. PATENT DOCUMENTS

| | | |
|---|---|---|
| 4,109,737 | 8/1978 | Bovenkerk . |
| 4,504,284 | 3/1985 | Ohno . |
| 4,525,178 | 6/1985 | Gigl . |
| 4,629,373 | 12/1986 | Hall . |
| 4,784,023 | 11/1988 | Dennis . |
| 4,858,707 | 8/1989 | Jones et al. . |
| 4,872,520 | 10/1989 | Nelson . |
| 4,954,139 | 9/1990 | Cerutti . |
| 4,972,637 | 11/1990 | Dyer . |
| 4,984,642 | 1/1991 | Renard et al. . |
| 4,997,049 | 3/1991 | Tank et al. . |
| 5,007,207 | 4/1991 | Phaal . |
| 5,011,515 | 4/1991 | Frushour . |
| 5,025,874 | 6/1991 | Barr et al. . |
| 5,037,451 | 8/1991 | Burnand et al. . |
| 5,054,246 | 10/1991 | Phaal et al. . |
| 5,057,124 | 10/1991 | Cerceau ................................... 51/293 |
| 5,120,327 | 6/1992 | Dennis . |
| 5,172,778 | 12/1992 | Tibbitts jet al. . |
| 5,217,081 | 6/1993 | Waldenström et al. . |
| 5,351,772 | 10/1994 | Smith . |

FOREIGN PATENT DOCUMENTS

| | | |
|---|---|---|
| 0322214B1 | 6/1989 | European Pat. Off. . |
| 0389800 | 3/1990 | European Pat. Off. . |
| 0369852 | 5/1990 | European Pat. Off. . |
| 369852 | 5/1990 | European Pat. Off. . |
| 2355990 | 5/1977 | France . |
| 4-152003 | 9/1992 | Japan . |
| 911004 | 3/1982 | U.S.S.R. . |
| 1694847 | 11/1991 | U.S.S.R. ................................. 175/434 |
| 93384328/48 | 11/1992 | U.S.S.R. . |

*Primary Examiner*—Jack W. Lavinder

[57] ABSTRACT

An abrasive tool insert comprises a cemented substrate and a polycrystalline diamond layer formed thereon by high pressure, high temperature processing. The interface between the substrate and the diamond layer comprises at least one angled profile wherein said profile slopes downwardly and outwardly toward the periphery of the insert.

5 Claims, 4 Drawing Sheets

USEFUL PART OF COMPACT

ABRASIVE TOOL INSERT

FIELD OF THE INVENTION

The present invention relates to the field of abrasive tool inserts and, more particularly, to such inserts having at least one angled contour at the diamond/substrate interface to provide improved durability and reduced susceptibility to spalling, cracking and wear of the diamond layer.

BACKGROUND OF THE INVENTION

Abrasive compacts are used extensively in cutting, milling, grinding, drilling and other abrasive operations. The abrasive compacts typically consist of polycrystalline diamond or cubic boron nitride particles bonded into a coherent hard conglomerate. The abrasive particle content of abrasive compacts is high and there is an extensive amount of direct particle-to-particle bonding. Abrasive compacts are made under elevated temperature and pressure conditions at which the abrasive particle, be it diamond or cubic boron nitride, is crystallographically stable.

Abrasive compacts tend to be brittle and, in use, they are frequently supported by being bonded to a cemented carbide substrate. Such supported abrasive compacts are known in the art as composite abrasive compacts. The composite abrasive compact may be used as such in the working surface of an abrasive tool. Alternatively, particularly in drilling and mining operations, it has been found advantageous to bond the composite abrasive compact to an elongated cemented carbide pin to produce what is known as a stud cutter. The stud cutter is then mounted in the working surface of a drill bit or a mining pick.

Fabrication of the composite is typically achieved by placing a cemented carbide substrate into the container of a press. A mixture of diamond grains or diamond grains and catalyst binder is placed atop the substrate and compressed under high pressure, high temperature (HPHT) conditions. In so doing, metal binder migrates from the substrate and "sweeps" through the diamond grains to promote a sintering of the diamond grains. As a result, the diamond grains become bonded to each other to form a diamond layer, and that diamond layer is bonded to the substrate along a conventionally planar interface. Metal binder remains disposed in the diamond layer within pores defined between the diamond grains.

A composite formed in the above-described manner may be subject to a number of shortcomings. For example, the coefficients of thermal expansion and elastic constants of cemented carbide and diamond are close but not exactly the same. Thus, during heating or cooling of the polycrystalline diamond compact (PDC), thermally induced stresses occur at the interface between the diamond layer and the cemented carbide substrate, the magnitude of these stresses being dependent on the disparity in thermal expansion coefficients and elastic constants.

Another potential shortcoming which should be considered relates to the creation of internal stresses within the diamond layer which can result in a fracturing of that layer. Such stresses also result from the presence of the cemented carbide substrate and are distributed according to the size, geometry and physical properties of the cemented carbide substrate and the polycrystalline diamond layer.

European Patent Application No. 0133 386 suggests a PDC in which the polycrystalline diamond body is completely free of metal binders and is to be mounted directly on a metal support. However, the mounting of a diamond body directly on metal presents significant problems relating to the inability of the metal to provide sufficient support for the diamond body. The European Patent Application further suggests the use of spaced ribs on the bottom surface of the diamond layer which are to be embedded in the metal support.

According to the European Patent Application, the irregularities can be formed in the diamond body after the diamond body has been formed, e.g., by laser or electronic discharge treatment, or during the formation of the diamond body in a press, e.g., by the use of a mold having irregularities. As regards the latter, it is further suggested that a suitable mold could be formed of cemented carbide; in such case, however, metal binder would migrate from the mold and into the diamond body, contrary to the stated goal of providing a metal free diamond layer. The reference proposes to mitigate this problem by immersing the thus-formed diamond/carbide composite in an acid bath which would dissolve the carbide mold and leach all metal binder from the diamond body. There would thus result a diamond body containing no metal binder and which would be mounted directly on a metal support. Notwithstanding any advantages which may result from such a structure, significant disadvantages still remain, as explained below.

In sum, the European Patent Application proposes to eliminate the problems associated with the presence of a cemented carbide substrate and the presence of metal binder in the diamond layer by completely eliminating the cemented carbide substrate and the metal binder. However, even though the absence of metal binder renders the diamond layer more thermally stable, it also renders the diamond layer less impact resistant. That is, the the diamond layer less impact resistant. That is, the diamond layer is more likely to be chipped by hard impacts, a characteristic which presents serious problems during the drilling of hard substances such as rock.

It will also be appreciated that the direct mounting of a diamond body on a metal support will not, in itself, alleviate the previously noted problem involving the creation of stresses at the interface between the diamond and metal, which problem results from the very large disparity in the coefficients of thermal expansion between diamond and metal. For example, the thermal expansion coefficient of diamond is about $45 \times 10^{-7}$ cm/cm/°C. as compared to a coefficient of $150-200 \times 10^{-7}$ cm/cm/°C. for steel. Thus, very substantial thermally induced stresses will occur at the interface. In addition, once the portions of the diamond which do not carry the ribs begin to wear sufficiently to expose the metal therebehind, that metal will wear rapidly, due to its relative ductility and lower abrasion/erosion resistance, and undermine the integrity of the bond between the diamond and the metal support.

Recently, various PDC structures have been proposed in which the diamond/carbide interface contains a number of ridges, grooves or other indentations aimed at reducing the susceptibility of the diamond/carbide interface to mechanical and thermal stresses. In U.S. Pat. No. 4,784,023, a PDC includes an interface having a number of alternating grooves and ridges, the top and bottom of which are substantially parallel with the compact surface and the sides of which are substantially perpendicular the compact surface.

U.S. Pat. No. 4,972,637 provides a PDC having an interface containing discrete, spaced recesses extending into the cemented carbide layer, the recesses containing abrasive material (e.g., diamond) and being arranged in a series of rows, each recess being staggered relative to its nearest neighbor in an adjacent row. It is asserted in the '637 patent that as wear reaches the diamond/carbide interface, the recesses, filled with diamond, wear less rapidly than the cemented carbide and act, in effect, as cutting ridges or projections. When the PDC is mounted on a stud cutter, as shown in FIG. 5 of the '637 patent, the wear plane 38 exposes carbide regions 42 which wear much more rapidly than the diamond material in the recesses 18. As a consequence, depressions develop in these regions between the diamond filled recesses. The '637 patent asserts that these depressed regions, which expose additional edges of diamond material, enhance the cutting action of the PDC.

U.S. Pat. No. 5,007,207 presents an alternative PDC structure having a number of recesses in the carbide layer, each filled with diamond, which make up a spiral or concentric circular pattern, looking down at the disc shaped compact. Thus, the '207 structure differs from the '637 structure in that, rather than employing a large number of discrete recesses, the '207 structure uses one or a few elongated recesses which make up a spiral or concentric circular pattern. FIG. 5 in the '207 patent shows the wear plane which develops when the PDC is mounted and used on a stud cutter. As with the '637 patent, the wear process creates depressions in the carbide material between the diamond filled recesses. Like the '207 patent, the '637 patent also asserts that these depressions which develop during the wear process enhance cutting action.

Whereas the aforementioned patents assert a desirable cutting action in the rock, it is also highly desirable to minimize the diamond layer's susceptibility to fracture and spalling which in part arises from the internal residual stresses.

Accordingly, it would be highly desirable to provide a polycrystalline diamond compact having increased resistance to diamond spalling fractures.

SUMMARY OF THE INVENTION

One object of the present invention is a polycrystalline compact having increased useful life.

Another object of the present invention is a polycrystalline diamond compact having a diamond layer formed such that there is reduced spalling and cracking of the diamond layer as the compact wears.

A further object of the invention is a PDC in which the carbide layer provides increased mechanical support, for the diamond layer as the compact wears. for the diamond layer as the compact wears.

Still another object of the invention is a PDC in which the diamond-carbide interface is so designed to reduce residual tensile stresses in the location where spalling or delamination usually occurs.

These, as well as other objects and advantages, are provided by an improved polycrystalline diamond compact having angled contours in the carbide layer, said layer being covered with diamond or other abrasive material shaped such that it provides outwardly sloping profiles at the periphery edge of the compact.

Advantageously, the outwardly sloping profiles are disposed in such ways as to provide stress reduction benefit across the most useful portion of the compact during its wear-resistant lifetime.

BRIEF DESCRIPTION OF THE DRAWINGS

The invention will be appreciated by those skilled in the art after reading the Detailed Description below, which is intended to be read in combination with the following set of figures, in which.

DETAILED DESCRIPTION OF THE INVENTION

Figure 1:
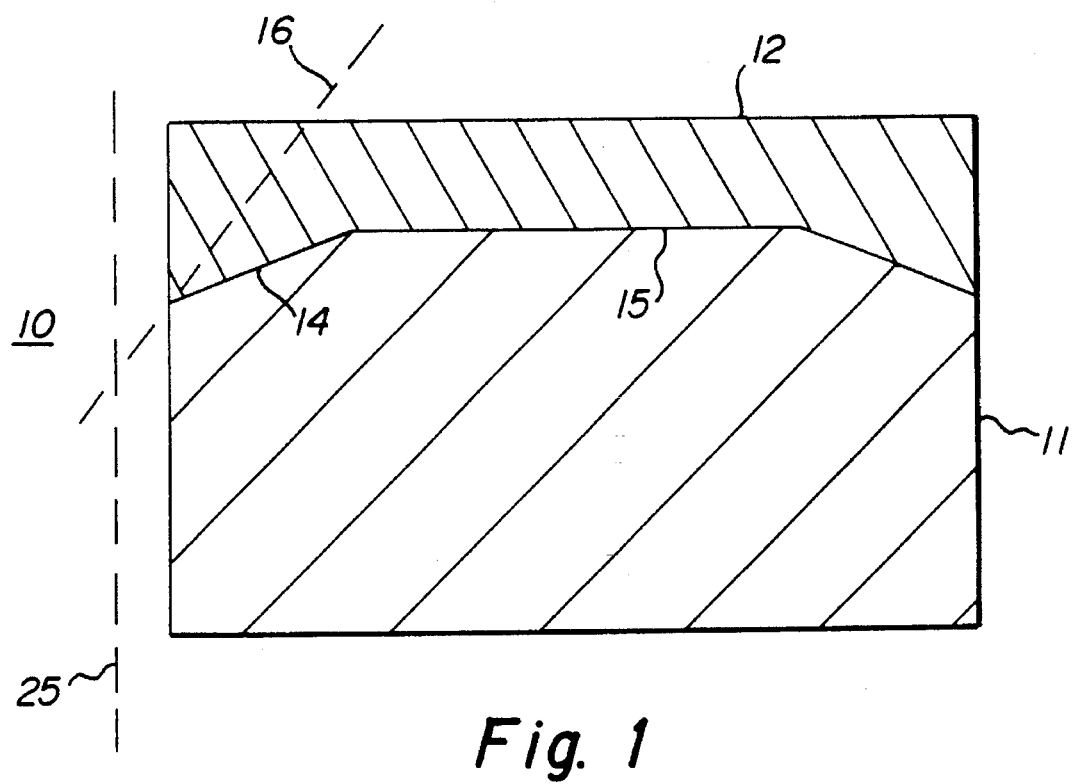
FIG. 1 depicts a cross-sectional view of a PDC having a single outwardly sloping angled contour in the vicinity of the cutting edge.

Reference is now made to FIG. 1 which shows an exemplary cross-sectional profile of a PDC in accordance with the invention. PDC 10 includes a substrate 11, preferably comprised of cemented carbide, and an abrasive layer 12, preferably comprised of polycrystalline diamond. Abrasive layer 12 is integrally bonded to substrate 11 and, in the typical manufacturing process, will be formed thereon by HPHT processing.

Figure 2:
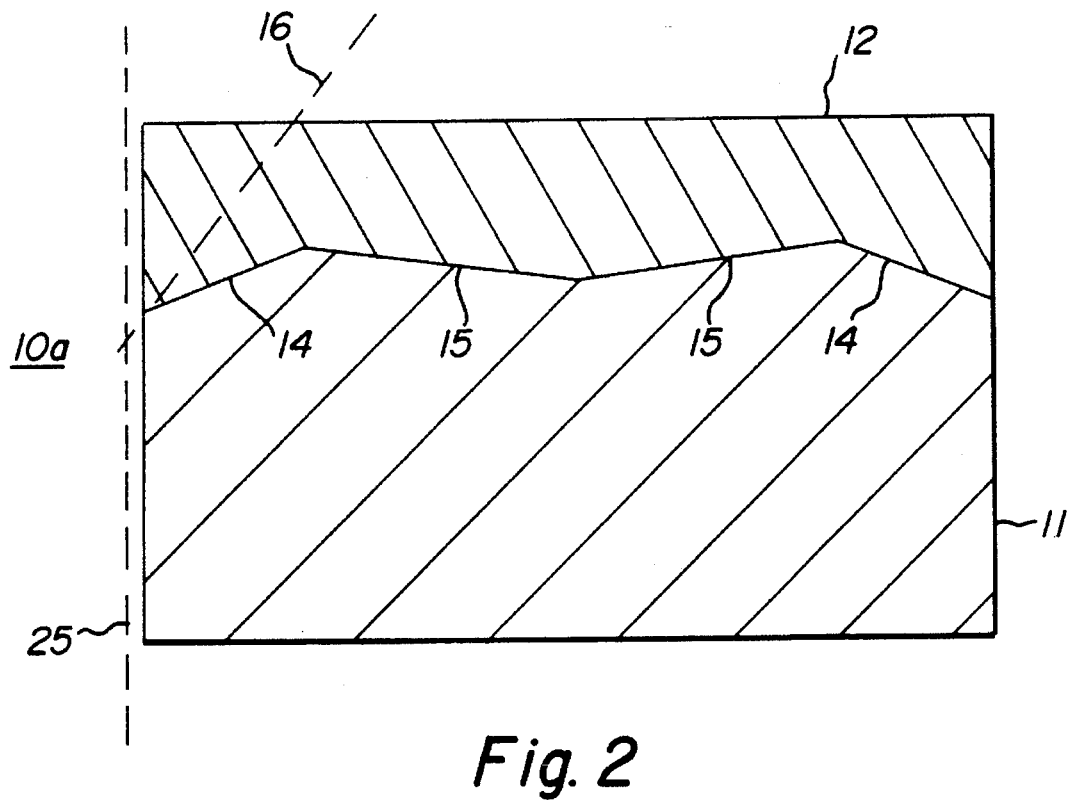
FIG. 2 depicts a cross-sectional view of a PDC having an outwardly sloping pattern at its periphery and an inwardly sloping pattern at its center.

For reference, FIGS. 1 and 2 depict the cutting edge 25 and anticipated wear plane 16. In application, edge 25 and plane 16 will, of course, depend on the manner in which PDC 10 is mounted on a stud cutter or other support means.

As illustratively depicted in FIG. 2, PDC 10a, the cross sectional profile of the boundary between substrate 11 and abrasive layer 12 comprises a plurality of sloped surfaces, including outwardly sloping surfaces 14, and inwardly sloping surfaces 15.

In each of the embodiments, surface 14 slopes outwardly and downwardly toward cutting edge 25 and is angled between about 10 to about 50 degrees and more preferably between about 25 and 45 degrees with the top surface of abrasive layer 12.

In use, as PDC 10 wears, wear plane 16 (which represents the surface providing cutting action) slowly progresses toward the center of the compact. Until wear plane 16 reaches the first sloping surface 14, wear plane 16 intersects only the abrasive layer 12, which provides excellent cutting and wear characteristics. Compared to abrasive layer 12, substrate layer 11 wears relatively quickly. Therefore, once wear plane 16 descends beyond the first sloping surface 14, the substrate material 11 intersecting wear plane 16 erodes away more quickly and a diamond lip forms according to accepted understanding to those knowledgeable of typical PDC wear characteristics.

During drilling, PDC 10 experiences very high stresses in the abrasive, or diamond, layer 12, particularly near the interface with substrate 11. Such stresses, some of which have been previously discussed, lead to fracturing and spalling in the diamond layer. These application stresses occur randomly and intermittently during drilling. They vary in magnitude and direction according to the localized contact dynamics with the rock face and rock particles in the hole. During events characterized by high tensile stress, cracks can form in the diamond layer. These cracks, being subjected to repeated high stress events, can propagate to form fracturing and spalling of the diamond layer. One region particularly susceptible to such occurrence is at or very near the diamond-carbide interface in the diamond layer. This region, in PDC's not of the present invention, suffers from pre-existing high residual tensile stresses which have previously been discussed.

Advantageously, the cross-sectional profile depicted in FIG. 1 reduces the residual tensile stresses in the diamond or abrasive layer 12 in precisely the region where spalling or delamination occur most frequently, even as the wearplane progresses well into the compact.

Figure 4:
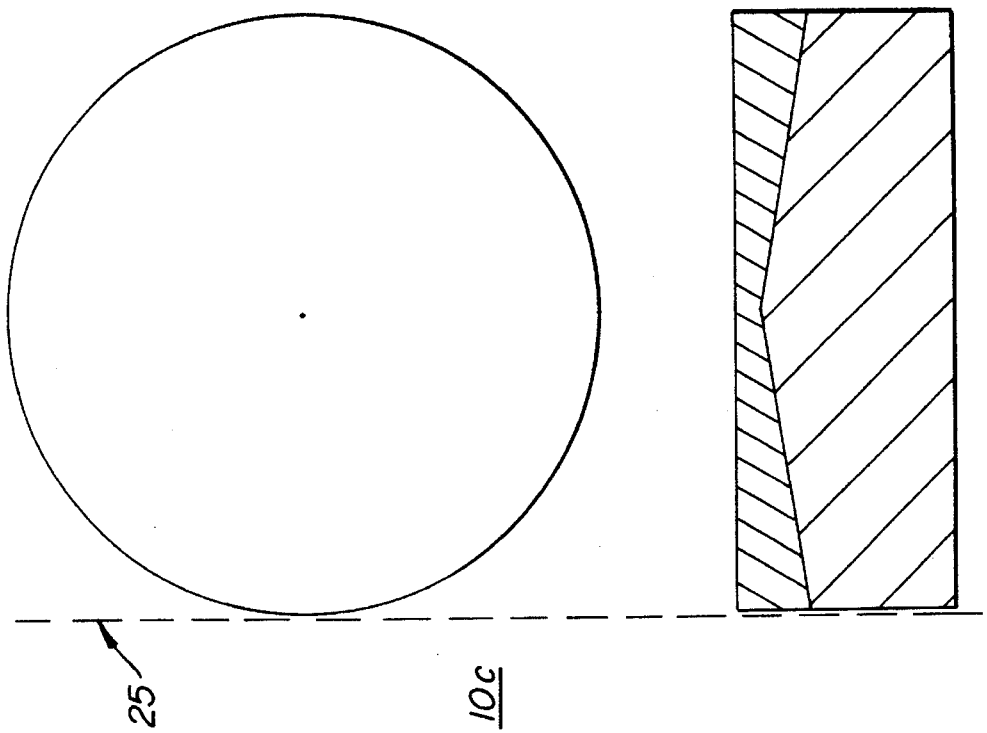
FIG. 4 depicts top and cross-sectional views of a PDC having a concentric sloping contour extending from the cutting edge to the center of the compact.
Figure 3:
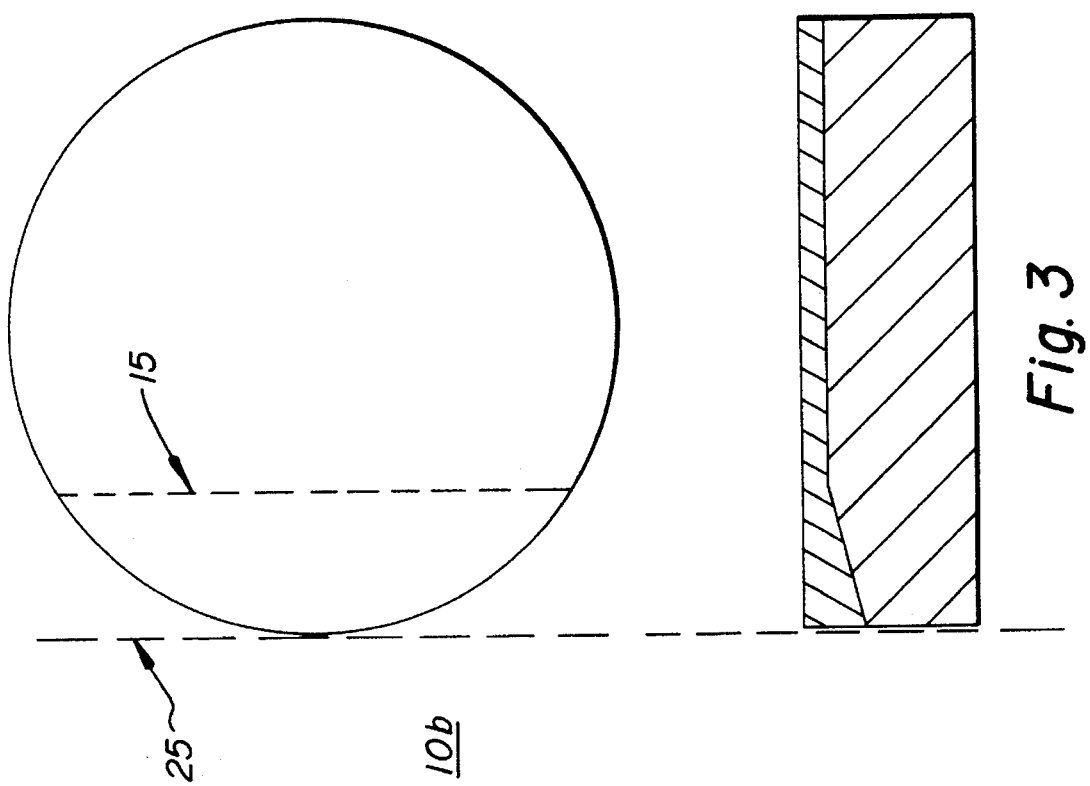
FIG. 3 depicts top and cross-sectional views of a PDC having a single sloping plane edge at the interface in accordance with the invention.
Figure 5A:
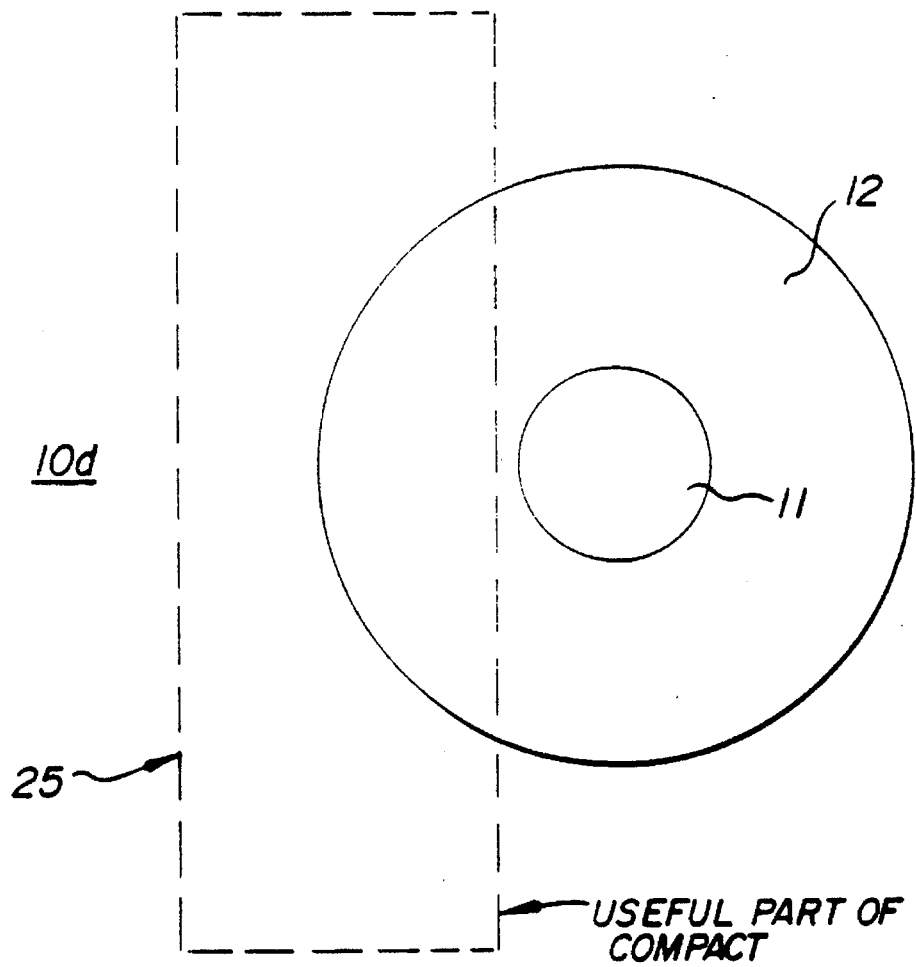
FIG. 5 depicts top and cross-sectional views of a PDC having a sloping concentric contour which intersects the top surface of the compact.
Figure 5B:
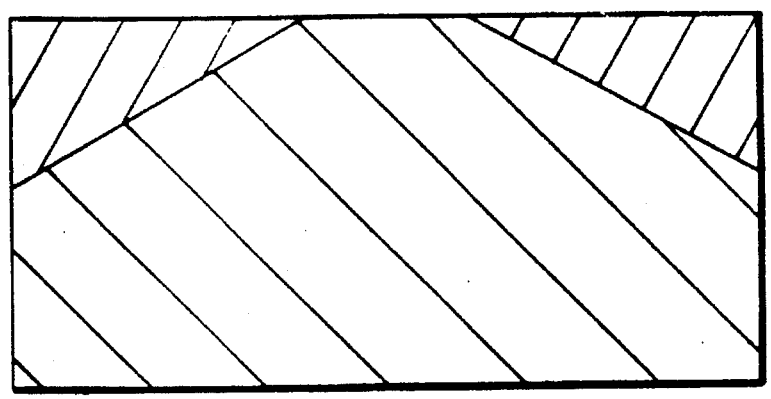
Figure 5:
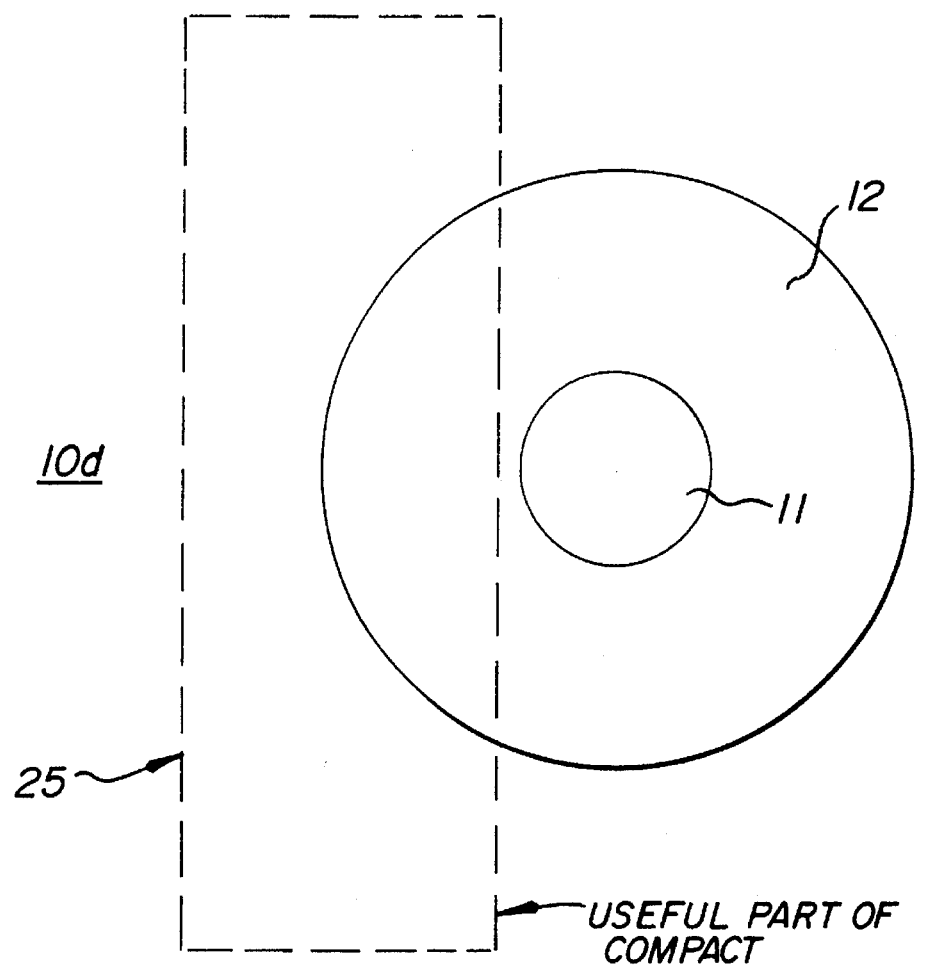
Figure 5:
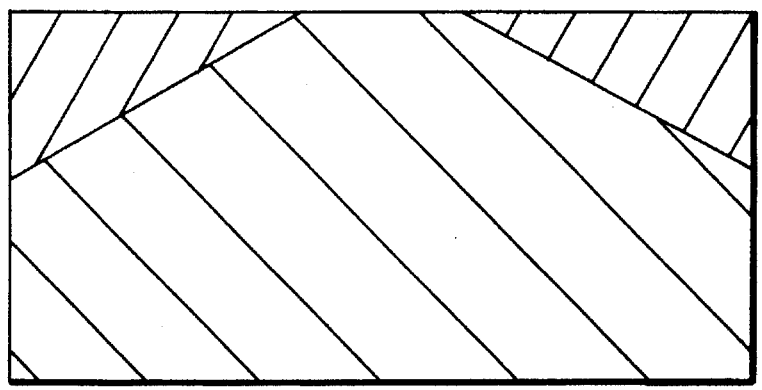

There are many ways in which the angled cross-sectional profile depicted in FIG. 1 can be implemented in an industry compatible disc shaped abrasive compact. FIG. 2 depicts one such embodiment. FIGS. 3, 4 and 5 present top and cross-sectional views of three other such exemplary embodiments.

FIG. 3 shows a PDC 10b wherein the top ridge 15 of the contour is linear, forming a chord of the circular compact. In this case the sloping contour is a plane extending from cutting edge 25 to top ridge 15.

FIG. 4 depicts a PDC 10c having a single concentric sloping contour which forms the entire abrasive/substrate interface.

FIG. 5 depicts a PDC 10d having a sloping concentric contour according to the invention wherein the sloping interface intersects the top surface, resulting in a top zone which is made of substrate 11 which is outside the useful portion of the compact.

Other embodiments, such as one based on a spirally shaped pattern of slopes, are also possible. While the invention has been described with reference to the presently preferred embodiments thereof, it is understood that the scope of the invention shall be limited only in accordance with the following claims.

What is claimed is:

1. an abrasive tool insert comprising:

a substrate, a continuous abrasive layer having a periphery forming a cutting surface, said abrasive layer integrally formed on said substrate and defining an interface therebetween, wherein said interface includes at least one sloped region extending from said cutting surface to a substantially planar region, said planar region extending from said sloped region to said periphery, such that said abrasive layer is thicker at said cutting surface than at regions immediately and radially interior to said cutting surface.

2. A tool insert as defined in claim 1, wherein said abrasive layer further comprises a top flat surface, wherein said sloped region is sloped between about 10 to about 50 degrees to said top flat surface.

3. A tool insert as defined in claim 2, wherein said sloped region is sloped between 25 to about 45 degrees to said top flat surface.

4. An abrasive tool insert as defined in claim 1 wherein said substrate is made of cemented carbide.

5. A tool insert as defined in claim 1 wherein said abrasive compact is made of polycrystalline diamond.

\* \* \* \* \*